Jan. 26, 1932.                C. R. RANEY ET AL                1,842,764
                                HARVESTER THRESHER
                              Filed Oct. 17, 1928          5 Sheets-Sheet 1

Inventors.
Clemma R. Raney
and Albert B. Welty.
By H.P. _____
      Atty.

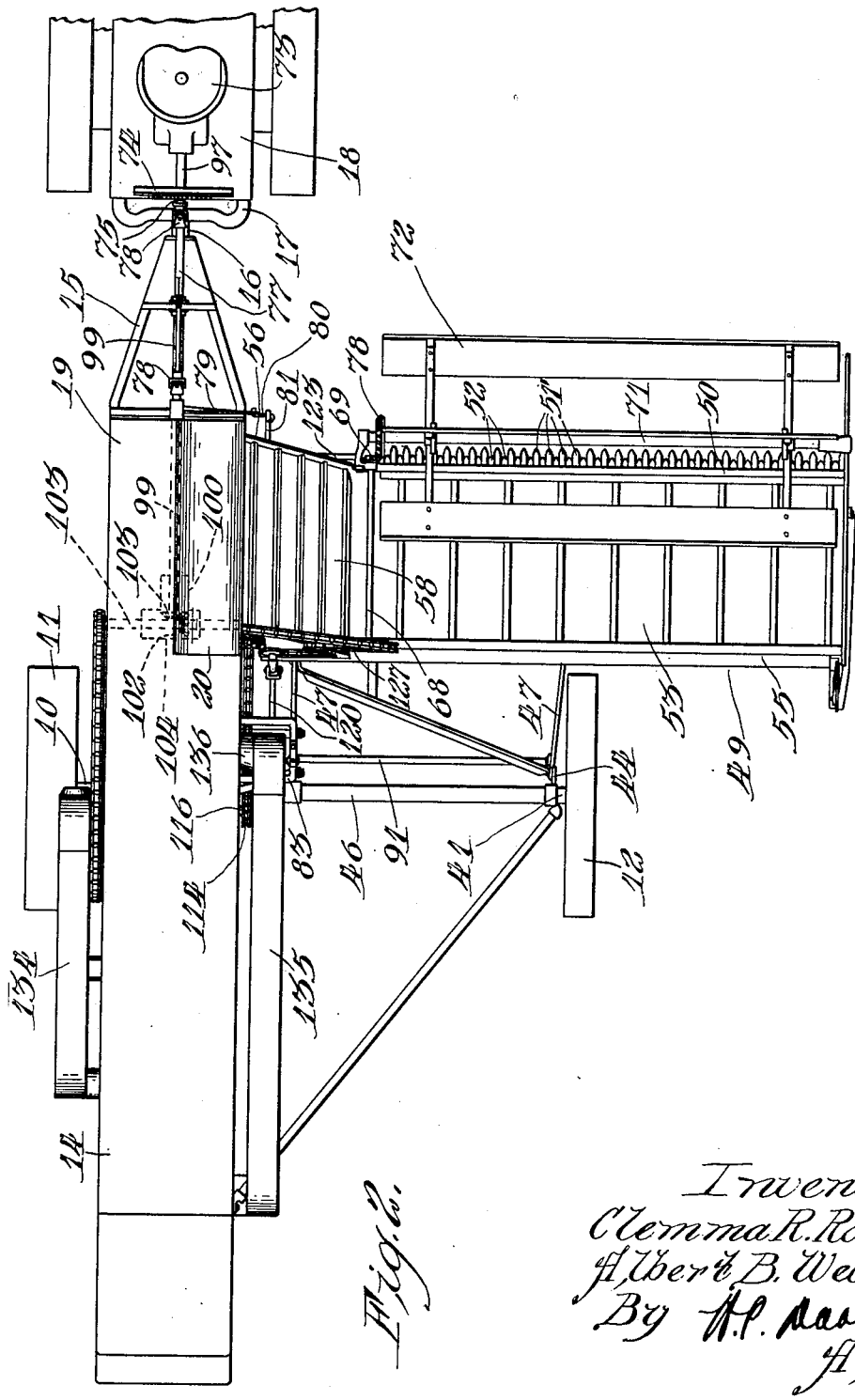

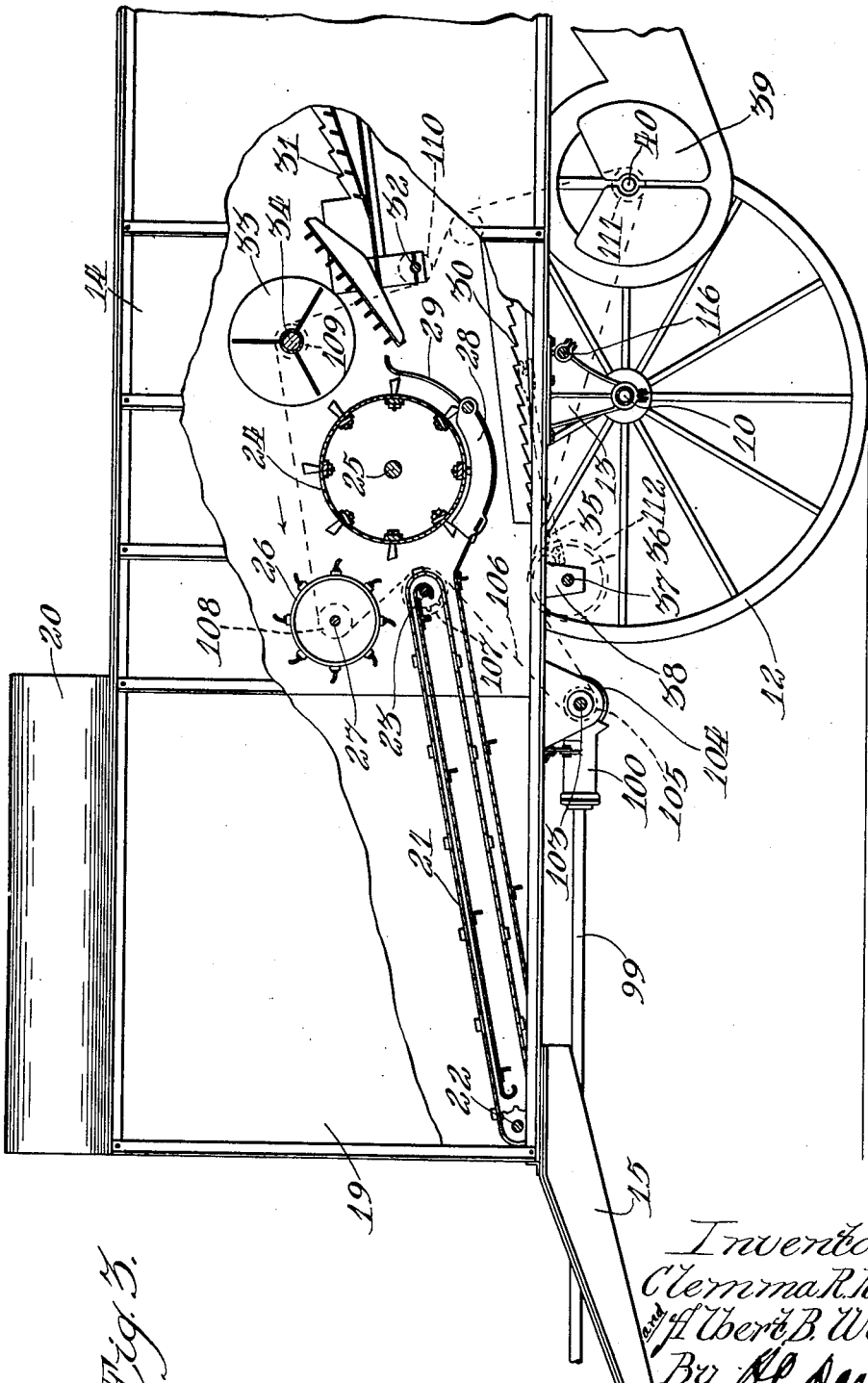

Jan. 26, 1932.   C. R. RANEY ET AL   1,842,764
HARVESTER THRESHER
Filed Oct. 17, 1928   5 Sheets-Sheet 5
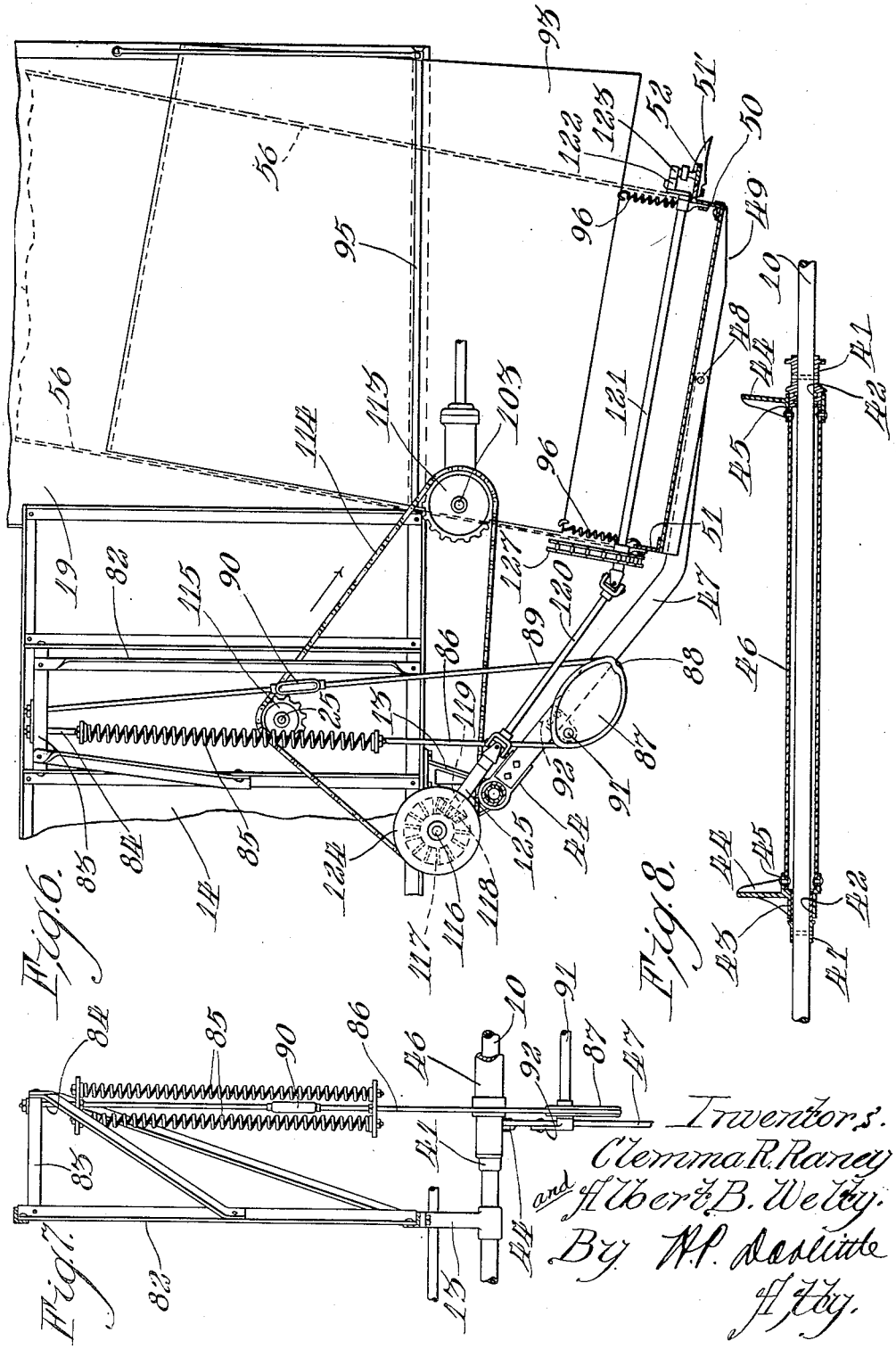

Patented Jan. 26, 1932

1,842,764

UNITED STATES PATENT OFFICE

CLEMMA R. RANEY, OF RIVERSIDE, AND ALBERT B. WELTY, OF CHICAGO, ILLINOIS, ASSIGNORS TO INTERNATIONAL HARVESTER COMPANY, A CORPORATION OF NEW JERSEY

HARVESTER THRESHER

Application filed October 17, 1928. Serial No. 312,983.

This invention relates to a harvester thresher.

It is well known that the use of harvester threshers materially reduces the production cost of harvesting grains. Such machines, however, have in the past been of such a large size and of such great initial cost that their use has been almost entirely confined to those farmers who have a sufficiently large acreage of grain to warrant their use. Thus, it is that farmers who have smaller acreages of grain must use the older methods of harvesting by using grain binders. It so happens that the farmer who produces his grain with a grain binder cannot produce his grain at as low a cost per bushel as the farmer with a large acreage using harvester threshers. Obviously, therefore, it is highly desirable that a small size harvester thresher be provided for the farmer with small acreages so that he will be enabled to compete in the cost of producing his grain with the farmer having the large acreage using harvester thresher methods.

Accordingly, it is the primary object of this invention to provide a relatively small size harvester thresher, having a width of cut comparable with the width of cut of grain binders so that such small size harvester thresher may entirely supplant or replace the use of the grain binder to enable the user thereof to obtain the advantage of a low cost in producing his wheat. Another object is to make such small machine very light by simplifying the same so that its initial cost will not be too high to prohibit its use by the smaller farmer.

Other objects are to provide a simplified driving mechanism for the operative parts of the harvester thresher; to provide an improved mounting for a harvester platform for this machine; to provide a novel adjusting and counter-balancing means for said harvester platform; to provide an improved platform including a novel feeding structure for transferring the grain to the thresher part of the machine; and, lastly, generally to provide an improved, small size, light harvester thresher.

Other objects will become apparent to those skilled in this art as the description of the improved machine continues.

These desirable objects are briefly accomplished in a harvester thresher having a rigid axle, supported in a pair of spaced wheels, which axle carries at its stubbleward side the thresher part of the machine, and at its grainward side, said axle is provided with a rockable sleeve structure which supports connections for carrying the harvester platform. This harvester platform is constructed as a unit with an elevator which delivers the grain into a feed housing in advance of the thresher part. The thresher part and harvester part have their operative mechanisms driven from a simple transmission mechanism actuated by the power take-off shaft of a tractor, which tractor also supports the forward end of the machine and serves to provide the necessary draft power for pulling the machine through the field. A novel counter-balance structure is included in the machine to make vertical adjustments of the platform easy.

An illustrative embodiment of the invention is shown in the accompanying sheets of drawings in which like characters of reference denote like parts throughout, and wherein:

Figure 1 is a general side elevational view of the harvester thresher and rear end of a tractor as viewed from the grainward side;

Figure 2 is a general plan view of the structure shown in Figure 1;

Figure 3 is an enlarged view showing the main portion of the thresher part as viewed from the stubbleward side, the side wall being partially broken away to show the feeder and thresher parts;

Figure 6 is a side elevational view as viewed from the grainward side showing the platform mounting, the counter-balance, and certain of the driving parts;

Figure 7 is a rear elevational view showing the improved counter-balance mechanism;

Figure 8 is a horizontal sectional view showing the axle and sleeve which rockably carries the platform; and Figure 9 is a detail view, partly in section, of a portion of the threshing mechanism.

Figure 4:
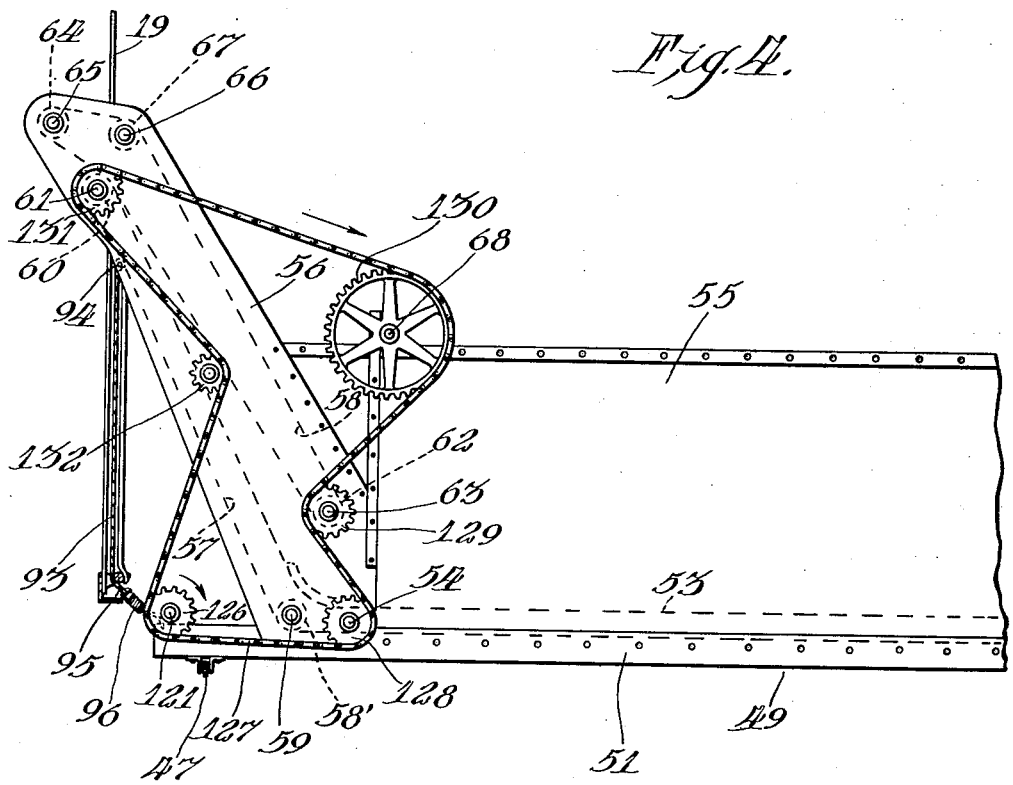
Figure 4 is a rear elevational view of the platform and elevator, which is a unitary structure.
Figure 5:
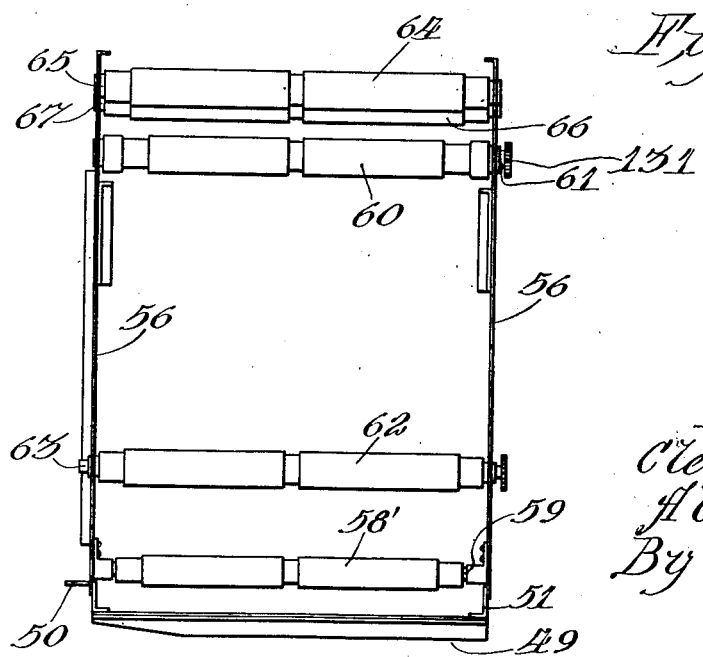
Figure 5 is a detail view of the elevator frame with the aprons removed, as seen from the left looking to the right in Figure 4.

The axle of the machine is shown at 10 and comprises a unitary, transversely disposed member which is non-rotatable and journaled in a main wheel 11 and a grain wheel 12.

The axle 10 at its stubbleward side is provided with brackets 13 (only one of which is shown), and these brackets carry the body 14 of the thresher part which in this showing is of long, rectangular shape arranged longitudinally of the machine. The forward end of the body 14 is provided with a draft element 15, terminating at its forward end in a clevis 16 designed for detachable connection to the draw-bar 17 of a tractor generally indicated at 18. It will thus be seen that the draw-bar 17 of the tractor forms a front support for the harvester thresher.

The forward end of the rectangular thresher body 14 carries a feed housing 19 which, as best shown in Figures 1 and 3, is open at its grainward side and has the grainward end of its top, or roof, extended upwardly at 20 in the form of a flared hood so that it will readily receive grain coming from the elevator spout, which will later be described.

Arranged in the feed housing 19 is a slightly inclined feeder conveyor 21, having its forward end running over an idler roller and shaft structure 22 and its rearward end over a similar roller and shaft structure 23. Spaced slightly to the rear of the discharge end of the feeder conveyor 21 is a threshing cylinder 24 carried on a shaft 25 journaled in any approved manner in the sides of the thresher body. Positioned in advance of the threshing cylinder 24, and above the discharge end of the conveyor 21, is a spiked feed regulating drum 26 carried on shaft 27, which is also journaled in the side walls of the thresher body. Beneath the threshing cylinder is a usual form of cylinder concave 28, grate bars 29, and therebelow a grain pan 30. All of this structure is best shown in Figure 3, where it will also be seen that straw walkers 31 are arranged in back of the cylinder and operable from a crank shaft 32 mounted in the side walls of the thresher body.

Between the threshing cylinder and the straw walkers is a beater, or paddle, member 33 carried on a shaft 34. The grain pan 30 is kept shaking by a pitman 35 eccentrically connected to a wheel 36, turned by a shaft 37 journaled in brackets 38 beneath the thresher body. A main blower is shown at 39 carried on a shaft 40.

The improved mounting of the harvester platform will next be described.

The grainward end of the axle 10, as best shown in Figures 2 and 8, carries two spaced collars 41 made fast to the axle in any suitable manner such as by pins or keys. Each collar 41 includes a bearing sleeve 42, and rockably mounted on each bearing 42 is the collar 43 of a bracket 44. Each bracket 44 includes another collar part 45, and these two collar portions 45 have riveted thereto a torque sleeve 46. Thus, it will be seen that the sleeve 46 and brackets 44 are rockable as a unit about the stationary axle 10 on the bearing portions of the collars 41. Each bracket 44, as best shown in Figures 2 and 6, has bolted thereto downwardly and forwardly extending line bars 47 which carry at their forward ends on pivots 48 a harvester platform 49. The platform embodies at its front end the bar 50 and at its rear end the transverse angle bar 51. It will now be appreciated that the platform 49 extends transversely and in offset relationship with respect to the longitudinal thresher body and in advance of the grain wheel 12, as best shown in Figure 2.

The bar 50 is provided with the usual cutting apparatus, including guard fingers 51' and a sickle or knife 52. An apron conveyor of the usual construction is shown at 53 on the platform 49, the stubbleward end of the apron being trained around a roller (not shown) on a shaft 54. See Figure 4. A backboard 55 is provided for the platform for the usual purpose.

The elevator spout in the harvester thresher of this invention is a unit with the platform and thus constitutes a radical departure from harvester threshers as now known in which the elevator spout leading to the feed housing is usually separate and a part independent of the platform. The elevator spout comprises side frame boards 56 which are inclined upwardly and in the direction of the feed housing 19. These side boards 56 are provided with a lower elevator conveyor 57 and an upper elevator conveyor 58, these two conveyors being of the endless, apron type and spaced apart so that the material from the platform is fed upwardly to the feed housing between the two apron conveyors. The lower apron conveyor 57 has its lower end trained around a roller 58' on a shaft 59, and its upper end around a roller 60 on a shaft 61. The upper apron conveyor 58 has its lower end trained around a roller 62 on a shaft 63, and its upper end trained around a roller 64 on a shaft 65, there being a supplementary idler roller 66 closely adjacent the roller 64 on a shaft 67 so as to cause the lower, or under, side of the upper apron to belly in when the material comes up so that it will be forcibly discharged laterally and downwardly into the feed housing 19 and onto the conveyor 21 at the bottom thereof.

The backboard 55, in any approved manner, carries a longitudinally disposed reel drive shaft 68, which shaft at its forward end carries a bevel pinion 69 meshing with a bevel gear 70 on a reel support shaft 71, said shaft 71 carrying a conventional reel 72 for co-operation with the cutting mechanism heretofore described.

The platform, of course, must be adjusted up or down in accordance with varying heights of grain encountered as the machine moves along. The mechanism for accomplishing this adjustment will next be described.

As the harvester thresher of this invention is of relatively small size, it is deemed desirable that the platform control be effected from the seat of the tractor which pulls the machine, which seat is shown at 73 in Figures 1 and 2. The platform of the tractor carries a support 74, and on this is carried for laterally swinging movement, a hand lever 75 associated with the usual detent lock and rack sector 76. This lever when unlocked and moved rocks a rock shaft 77, preferably of the telescopic extensible type, having universal joints 78 so that the shaft may accommodate itself to any angular displacement between the tractor and the drawn harvester thresher. At its back end, this shaft 77 is connected to an arm 79, which arm in turn carries at its free end a downwardly extending link 80 which has its lower end connected to an arm 81 connected in any approved manner with the front stubbleward corner of the platform or bar 50. Obviously, when the lever 75 is swung one way or the other the platform must be raised or lowered through the connections described.

As the platform is quite heavy, even though the machine is of small size, it is quite difficult for the operator to adjust the same, and, accordingly, a counter-balance assisting mechanism is provided, which will now be described.

As best shown in Figures 1, 6 and 7, a frame structure 82 is connected to the grainward side of the thresher body 14 substantially above the axle 10, this frame structure being suitably trussed to strengthen the same. An upper U-beam 83 of this frame structure carries a downwardly extending rod 84 connected to a spring 85, or a battery of springs if desired, which spring, or springs, is connected to a flexible cable 86 extending downwardly and trained around the lower side of a cam, or eccentric arm member, 87, the cable 86 being anchored to this member at the point 88. Another cable 89 is also connected to the cam at the point 88 and extends upwardly to be anchored to the beam 83. A turnbuckle 90 may be provided for purposes of take-up as will be understood. The cam 87 is pivotally carried on a shaft 91 carried in a bracket 92, rigidly mounted on the inner line bar 47. It must now be appreciated that the spring counterbalance exerts a force tending to support the platform through the line bar 47, and that such force assists the operator when he manipulates the hand lever 75. The cam 87 serves as a compensating mechanism which corrects the tendency in the springs to pull or exert their force with a lack of uniformity in the various up or down positions of the platform. This is so because the elongated cam tends to keep the spring under tension and stretched uniformly as the platform rises or falls, and thus the springs must exert a uniform pull.

Another important feature of the invention is in the provision of means for preventing the grain as it is delivered from the elevator spout into the feed housing from being wasted. This comprises a curtain 93 connected at its upper end to the elevator frames 56 at 94, as shown in Figure 4, and having its lower end trained around a rod 95, there being springs 96 connecting the lower end of the curtain 93 to the angle bar 51 and the bar 50. It can now be seen that as the unitary platform and elevator spout rise and fall with respect to the feed opening in the feed housing 19, the curtain 93 also rises and falls in accordance with such movement and thus always maintains the open side of the feed housing beneath the elevator spout at all times closed, thus preventing grain from spilling out of the feed housing. The springs 96 provide the necessary flexibility to accommodate the curtain to the various positions which the platform and elevator spout assume in operation.

As the machine is intended to be as light as possible, a great saving of weight can be accomplished by the elimination of the motor which is usually carried on the harvester thresher to drive the operative parts thereof. The harvester thresher of this invention eliminates the motor and the power for driving its operative mechanisms is derived from the power take-off shaft of the tractor which pulls the machine through the field. This power take-off shaft of the tractor is shown in Figures 1 and 2 at 97, the same being connected through a flexible shaft section 98 through a line shaft 99 extending longitudinally and centrally back underneath the feed housing 19. See also Figure 3.

The rear end of this line shaft 99 is journaled in a bearing box 100 and carries at its back end a bevel gear 101 in mesh with a bevel pinion 102, carried on a transverse shaft 103 journaled underneath the feed housing in a bearing box 104. The stubbleward end of the shaft 103 carries a sprocket wheel 105 as shown in Figure 3, around which is trained an endless sprocket chain 106 which has one lap thereof trained around a sprocket wheel 107 on the shaft 23 to drive the feeder conveyor 21; another lap thereof trained around a sprocket wheel 108 on the shaft 27 to drive the feed regulator drum 26; another lap trained around a sprocket wheel 109 on the shaft 34 to drive the member 33; another lap trained around a sprocket wheel 110 on the shaft 32 to actuate the straw walkers 31; another lap trained around a sprocket wheel 111 on the shaft 40 to drive the main blower 39; and, lastly, another lap around a sprocket wheel 112 on the shaft 37 to actuate the pitman 35 which shakes the pan 30.

The opposite, or grainward, end of the shaft 103, as best shown in Figure 6, carries a sprocket wheel 113 around which is trained a sprocket chain 114 which drives a sprocket wheel 115 on the cylinder shaft 25, thereby driving the threshing cylinder 24. This chain 114 also extends around a sprocket wheel (not shown) to drive a shaft 116. Said shaft carries a bevel gear 117 which it rotates and is in mesh with a bevel pinion 118 on a shaft 119, connected with a flexible line shaft extension 120 that drives a pitman drive shaft 121 carrying at its front end a crank 122 connected to a pitman 123, connected in any approved manner to reciprocate, or operate, the sickle 52. The gear 117 is enclosed in a shield 124, which includes an extension 125, forming a bearing and support for the shaft 119. The back end of the shaft 121 carries a sprocket wheel 126 around which is trained a chain 127 in mesh with a sprocket wheel 128 that drives the shaft 54, the chain being trained around a sprocket wheel 129 that drives the lower roller 62 of the upper elevator spout conveyor; the chain being also trained around a sprocket wheel 130 which drives the reel drive shaft 68 to operate the reel 72; the chain 127 then being trained around a sprocket wheel 131 to drive the shaft 61 to operate the upper roller 60 of the lower elevator conveyor; said chain then being trained around an idler sprocket 132 to complete the circuit, as best shown in Figure 4. In this manner, the platform apron and elevator aprons are driven. The thresher also includes a grain auger 133 which, in the usual manner common in threshers, conveys the cleaned and separated grain to an elevator spout 134 to discharge the grain from the machine. The thresher part also includes a tailings auger 134' which directs the tailings up a return elevator 135 which has a spout 136 returning this material to the threshing cylinder to be re-threshed and re-cleaned. As these tailings move up the elevator 135, they pass over a foraminous element 137 which screens the threshed grain and directs it down the spout 138 to the grain cleaning mechanism for re-cleaning. The remainder of this tailings material, of course, continues on up the elevator and through the spout 136 into the body of the thresher part for re-threshing.

The description and operation of the machine will now be given.

The machine is pulled through the field by the tractor 18, the forward end of the machine being directly connected to the drawbar of the tractor through the member 15 so that the tractor in effect forms a front support for the harvester thresher. The power take-off shaft 97, in the manner described, drives the operative parts of the thresher as well as of the harvester part. The sickle 52 reciprocates to cut the grain and, with the assistance of the reel 72, the cut grain is moved on to the apron conveyor 53 on the platform 49, which conveyor 53 is being moved by the driving chain 127 in the direction of the elevator spout indicated at 56 in Figure 4, which spout comprises the upper and lower apron conveyors running in directions to move the material upwardly therebetween to the open side of the feed housing 19 in advance of the thresher part. The upper elevator spout conveyor 58 has the upper end of its lower run adapted for inward flexing under the pressure of the upwardly moving grain so that the grain will forcibly be discharged in the direction of the feed housing 19 and particularly the feeder conveyor 21 therein, which receives the grain and moves it longitudinally rearwardly in combination with the spiked volume regulator 26 to the threshing cylinder 24. This cylinder in a conventional manner initially threshes the grain. The straw walkers 31 and grain pan 30 cooperate in the usual manner in this connection, and the cleaned grain is removed from the machine by means of the auger 133 and the discharge spout 134. The tailings are caught by the auger 134' and are moved up the elevator 135 where the foraminous element 137 screens out the cleaned grain and quickly returns it to the cleaned grain auger 133 whilst the tailings continue on upwardly and back into the front part of the thresher for re-threshing.

As the machine moves along, the operator from his station on the seat of the tractor must manipulate the lever 75 to raise or lower the platform for the purposes heretofore mentioned. Accordingly, he moves the lever 75 to rock the shaft 77 to pull up or push down on the link 80 through the arm 79, thus raising or lowering the platform, as the case may be. Here the spring counter-balance 85 automatically comes into play to assist the operator in moving the weight of the platform as the springs exert an up force to counter-balance the platform's weight. It is interesting to note that these counter-balance springs are vertically arranged and are anchored to the thresher part. Any tendency to lack of uniformity in the pull of the springs is compensated for by the cam 87, which as has been described acts to keep the lift on the cam shaft even, or substantially so, in all positions up or down of the platform.

The platform and elevator spout are, in fact, a single unit connected to move at all times together, and this is advantageous as the relative positions of the platform apron and the elevator spout aprons at all times remain the same as no relative movement between these parts can possibly take place to alter the evenness of the feeding operation. The curtain 93, in the manner heretofore described, very effectively serves to prevent wastage of grain out of the feed housing opening in the various high or low positions assumed by the elevator spout.

The location of the power take-off shaft 99 directly underneath the feed housing 19 makes for compactness and removes these shafts from an exposed position where they might catch on the clothes of an operator and cause him injury, as is frequently the case where these power take-off shafts are exposed.

Another important result from this invention lies in the provision of the very simple platform arrangement for a small size machine, the same being made possible and effective through the character of its mounting by means of the rockable sleeve structure 46 on the non-rockable, or stationary, axle 10, as illustrated in Figure 8.

From the above detailed description, it must now be obvious that the structure of this invention achieves all of the desirable objects heretofore set forth.

It is to be understood that only an illustrative embodiment of the invention has been shown and described, and that, obviously, the same is susceptible of many changes in form and location of parts without departing from the spirit and scope of the invention as indicated in the appended claims.

What is claimed is:

1. A harvester thresher having an axle, a thresher part on the axle, a feeder housing open at one side and located in advance of the thresher part, a platform and elevator spout for directing material into the open side of the feeder housing, means for bodily adjusting the platform and spout together as a unit up or down, and means carried by the spout to close the open side of the feeder housing beneath the spout when the spout is adjusted.

2. A harvester thresher having an axle, a thresher part on the axle, a feeder housing open at one side and located in advance of the thresher part, a platform and elevator spout for directing material into the open side of the feeder housing, means for adjusting the platform and spout together up or down, and a curtain movable with the spout to close that portion of the open side of the feeder housing beneath the spout.

3. A harvester thresher having a stationary dead axle carried by wheels, a thresher part rigidly mounted thereon, said part including a feeder housing in advance thereof and open at one side, a torque sleeve rockably carried on the axle, and a unitary rigidly associated platform and elevator spout structure carried on line bars rigidly connected to said rockable sleeve structure, said spout feeding into the feeder housing opening.

4. A harvester thresher having a stationary dead axle carried by wheels, a thresher part rigidly mounted thereon at its stubbleward end, said part including a feeder housing in advance thereof and open at one side, a torque sleeve structure rockably carried on the grainward end of the axle, and a unitary rigidly associated platform and elevator spout structure rigidly connected to said sleeve structure, the spout feeding into the open side of the feeder housing.

5. A harvester thresher having an axle, a thresher part thereon, a harvester part rockably connected thereto, means for adjusting the harvester part up or down, and means to assist the adjusting means comprising a counter-balance for the harvester part which is substantially vertically disposed above the axle.

6. A harvester thresher having an axle, a thresher part thereon, a harvester part rockably connected thereto, means for adjusting the harvester part up or down, and means to assist the adjusting means comprising a spring counter-balance for the harvester part, said counter-balance extending vertically and having its upper end anchored on the thresher part.

7. A harvester thresher having an axle, a thresher part thereon, a harvester part rockably connected thereto, means for adjusting the harvester part up or down, a vertically disposed spring counter-balance means for the harvester part anchored at one end to the top of the thresher part, and a compensating device for maintaining the pull of the spring substantially uniform in all positions of the harvester part.

8. A harvester thresher having a stationary dead axle, a thresher part rigidly mounted thereon, a sleeve structure rockably carried on the axle, a harvester platform connected to said sleeve structure to rock therewith, means for adjusting the platform up or down, and a vertically disposed spring counter-balance anchored at its upper end to the thresher part for counter-balancing the weight of the platform.

9. A harvester thresher having a stationary dead axle, a thresher part rigidly mounted thereon, a torque sleeve rockably carried on the axle, a harvester platform rigidly connected to said sleeve to rock therewith, said platform rigidly carrying an angularly disposed elevator spout, means for bodily adjusting the platform with the spout up or down, and a counter-balance for counter-balancing the weight of the platform and spout.

10. A harvester thresher having an axle, a thresher part thereon including a feeder, a harvester platform rockably connected to the axle, an angularly disposed elevator spout feeding to the feeder and rigidly carried on the platform so that these parts never change their relative angular positions with respect to each other, means for adjusting the combined platform and spout structure up or down, and means for counter-balancing the weight of said combined platform and spout structure.

11. A harvester thresher for use with a tractor having a power take-off shaft, the harvester thresher comprising an axle, a longitudinally disposed thresher part having a feeder housing at its front end including a draw bar for connection with the tractor, a harvester part offset from the thresher part and connected with the axle, a transverse countershaft beneath the thresher part for driving operative parts of the thresher and harvester parts, and a longitudinally disposed line shaft geared to the transverse shaft and arranged beneath the feeder housing and supported on the draw bar, said line shaft adapted for detachable connection with the power take-off shaft of the tractor.

12. In a harvester thresher, a thresher part, a feeder housing in advance of said thresher part, said housing being open at one side and having a flared raised hood, a harvester part including a platform, and an angularly related spout rigidly connected to the platform for discharging grain into the open side of the feeder housing beneath said hood.

13. A harvester thresher having a transversely disposed axle, a thresher part carried on the axle, a feeder housing open at one side and located in advance of the thresher part and in communication therewith, a transversely disposed harvester platform pivotally hung from said axle in offset relation with respect to the feeder housing, and an elevator spout carried by the discharge end of the platform in fixed angular relationship thereto, thereby providing a unitary platform and elevator spout structure, said spout discharging into the feeder housing through the open side thereof.

14. A harvester thresher having a transversely disposed axle, a thresher part carried on the axle, a feeder housing open at one side and located in advance of the thresher part and in communication therewith, a transversely disposed harvester platform adjustably hung from said axle in offset relation with respect to the feeder housing, and an upwardly inclined elevator spout carried rigidly by the discharge end of the platform in fixed angular relationship thereto, thereby providing a unitary platform and elevator spout structure adjustable as a unit, said spout discharging into the feeder housing through the open side thereof.

15. A harvester thresher having a transversely disposed axle, a thresher part carried on the axle, a feeder housing open at one side and located in advance of the thresher part and in communication therewith, a transversely disposed harvester platform adjustably hung from said axle in offset relation with respect to the feeder housing, an upwardly inclined elevator spout disposed transversely and connected rigidly to the discharge end of the platform in fixed angular relationship thereto, thereby providing a unitary platform and elevator spout structure adjustable as a unit, a transverse conveyor on the platform, and spaced upper and lower transverse conveyors on the spout to receive the material from the platform conveyor to elevate the material between the said two spout conveyors into the feeder housing through its open side.

16. A harvester thresher having a transversely disposed axle, a thresher part carried on the axle, a feeder housing open at one side and located in advance of the thresher part and in communication therewith, a transversely disposed harvester platform adjustably hung from said axle in offset relation with respect to the feeder housing, an upwardly inclined elevator spout disposed transversely and connected rigidly to the discharge end of the platform in fixed angular relationship thereto, thereby providing a unitary platform and elevator spout structure adjustable as a unit, a transverse endless conveyor on the platform, and spaced upper and lower transverse endless conveyors on the spout to receive the material from the platform conveyor to elevate the material between the said two spout conveyors into the feeder housing through its open side, the lower run of the apron near the top of the upper spout conveyor adapted to flex inwardly under the pressure of the material forcibly to discharge said material laterally into the feeder housing.

In testimony whereof we affix our signatures.

CLEMMA R. RANEY.
ALBERT B. WELTY.